US011221839B2

(12) United States Patent
Kulkarni et al.

(10) Patent No.: US 11,221,839 B2
(45) Date of Patent: Jan. 11, 2022

(54) EARLY SOFTWARE UPDATES FOR MULTI-TENANT INTEGRATION SERVICE

(71) Applicant: SAP SE, Walldorf (DE)

(72) Inventors: Gopalkrishna Kulkarni, Bangalore (IN); Andreas Quenstedt, Walldorf (DE); Appala Naidu Uppada, Bangalore (IN); Bhagyesh Hede, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/940,898

(22) Filed: Jul. 28, 2020

(65) Prior Publication Data
US 2021/0389938 A1    Dec. 16, 2021

(30) Foreign Application Priority Data
Jun. 15, 2020    (IN) .............................. 202011025081

(51) Int. Cl.
*G06F 8/65* (2018.01)
*G06F 9/54* (2006.01)
*G06F 11/36* (2006.01)
*G06F 8/61* (2018.01)

(52) U.S. Cl.
CPC .................. *G06F 8/65* (2013.01); *G06F 8/61* (2013.01); *G06F 9/54* (2013.01); *G06F 11/3664* (2013.01)

(58) Field of Classification Search
USPC ........................................................ 717/170
See application file for complete search history.

(56) References Cited

U.S. PATENT DOCUMENTS

| 9,733,921 | B1 * | 8/2017 | Saenz | G06F 8/60 |
| 10,768,920 | B2 * | 9/2020 | Fontoura | G06F 8/65 |
| 2017/0034023 | A1 * | 2/2017 | Nickolov | H04L 43/0817 |

(Continued)

OTHER PUBLICATIONS

Morey Haber; "Saas: Choosing Between Single-Tenant And MultiTenant Solutions"; Forbes.com website [full url in ref.]; 2019 (Year: 2019).*

(Continued)

*Primary Examiner* — Wei Y Zhen
*Assistant Examiner* — Clint Thatcher
(74) *Attorney, Agent, or Firm* — Buckley, Maschoff & Talwalkar LLC

(57) ABSTRACT

Methods and systems may be associated with a cloud computing environment. A provisioning application data store may contain information associated with services representing a plurality of multi-tenant cloud applications including, for a first SaaS application, indications that a first tenant qualifies for early software updates and has opted to receive early software updates. A cloud platform provisioning framework may determine that a new software update to the first application is available and is scheduled to be installed within a pre-determined time period (e.g., one day or week). The framework may then access the provisioning application data store to verify that the first tenant qualifies for early software updates and has opted to receive early software updates. As a result of the verification, the cloud platform provisioning framework may automatically install the new software update to the first application for the first tenant prior to the scheduled installation.

18 Claims, 10 Drawing Sheets

(56) References Cited

U.S. PATENT DOCUMENTS

2019/0102162 A1* 4/2019 Pitre ................. H04L 63/10
2019/0129701 A1* 5/2019 Hawrylo ............... G06F 8/60

OTHER PUBLICATIONS

"What is the Early Access Program {EAP)?"; Opmantek.com website [full url in ref]; 2019 (Year: 2019).*

Timothy B. Lee; "Tesla Keeps a Promise to Early Full Self-Driving Customers-Sort Of"; Arstechnica.com website [full url in ref.]; 2019 (Year: 2019).*

"New Release Phases for Google Cloud Platform"; GoogleBlog. com website [full url in ref.]; 2014 (Year: 2014).*

Maximilian Schneider and Johan Uhle; "Versioning for Software as a Service in the Context of Multitenancy"; University of Potsdam, Hasso-Plattner-Institute; 2013 (Year: 2013).*

* cited by examiner

EARLY SOFTWARE UPDATES FOR MULTI-TENANT INTEGRATION SERVICE

BACKGROUND

An enterprise may utilize a cloud computing environment to let users perform tasks. For example, the enterprise might let various users execute an application via the cloud computing environment to process purchase orders, adjust human resources information, generate invoices, etc. In some cases, the cloud computing environment will support multiple tenants and onboard Software as a Service ("SaaS") applications using multiple microservices (e.g., one microservice might be associated with a user interface while another microservice handles database resources). In some cases, a Cloud Platform Integration ("CPI") may act as middleware for applications or systems in integration scenarios. When an integration scenario is complete, it may be built and deployed to consumers (tenants of the appropriate account in the cloud platform) who can subscribe to the application through a marketplace user interface (e.g., showing tiles of available application).

Note that an integration service is a technical product. A consumer (e.g., a customer) of the service may create, deploy, and/or manage the integration scenarios (e.g., integration contents). A single instance of the application may be offered to multiple customers using a multi-tenancy concept. Moreover, an integration application/service typically goes though periodic software updates that can impact all of the tenants (customers). Since the integration service is a technical product that contains customer-built integration artifacts, these software update may sometimes result in incompatibilities that can only be fixed by changing the integration content.

One way to respond to this situation is to ask customers to re-model their integration scenarios or to ask a development team to fix the components that are involved. If customers are asked to fix the scenarios, then a customer may experience some downtime in message processing (because they have to re-model and re-deploy the content). In some cases, customers may have a TEST tenant and PRODUCTION tenant. The TEST tenants are used to run automation tests and the PRODUCTION tenant is where productive scenarios are executed. This set up will not help the customers because the software updates both the TEST and PRODUCTION tenants at the same time. There is no way to detect failures early enough and adopt scenarios accordingly. This can result in considerable downtime after a software update, especially when a substantial number of service updates, tenants, and/or applications are involved. It would therefore be desirable to provide an early software update for a multi-tenant cloud computing environment in a secure, automatic, and efficient manner.

SUMMARY

According to some embodiments, methods and systems may be associated with a cloud computing environment. A provisioning application data store may contain information associated with services representing a plurality of multi-tenant cloud applications including, for a first SaaS application, indications that a first tenant qualifies for early software updates and has opted to receive early software updates. A cloud platform provisioning framework may determine that a new software update to the first application is available and is scheduled to be installed within a pre-determined time period (e.g., one day or week). The framework may then access the provisioning application data store to verify that the first tenant qualifies for early software updates and has opted to receive early software updates. As a result of the verification, the cloud platform provisioning framework may automatically install the new software update to the first application for the first tenant prior to the scheduled installation.

Some embodiments comprise: means for determining, by a computer processor of a cloud platform provisioning framework, that a new software update to a first SaaS application is available and is scheduled to be installed within a pre-determined time period; means for accessing, by the cloud platform provisioning framework, a provisioning application data store to verify that a first tenant qualifies for early software updates and has opted to receive early software updates, wherein the provisioning application data store contains information associated with services representing a plurality of multi-tenant cloud applications; and, as a result of the verification, means for automatically installing the new software update to the first application for the first tenant prior to the scheduled installation.

Some technical advantages of some embodiments disclosed herein are improved systems and methods to provide an early software update for a multi-tenant cloud computing environment in a secure, automatic, and efficient manner.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

In a multi-cloud environment, the applications (e.g., SaaS applications) may be discoverable in a service-marketplace. Moreover, the consumer may subscribe to these services if his or her global account has the necessary eligibility (e.g., if the service is purchased). Note that the list of available SaaS applications can be substantial (e.g., it can contain hundreds of applications). In some cases, customers might buy packages that make them eligible for more than one service (e.g., a set of services might be combined and sold as a single package). Applications are usually periodically updated (e.g., to introduce new features, correct software bugs, etc.) and customers may need to make appropriate changes to support these updates.

Figure 1:
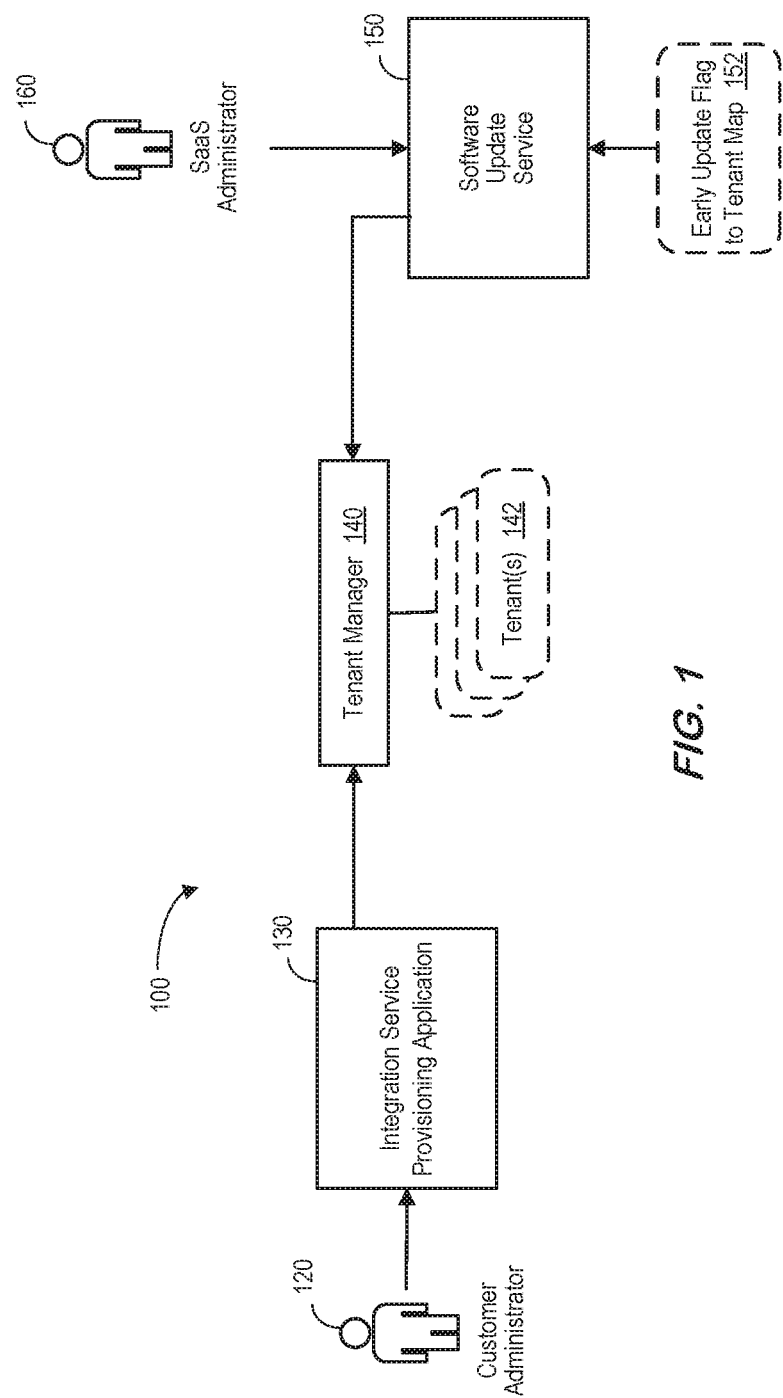
FIG. 1 is a high-level block diagram of a system architecture in accordance with some embodiments.

For example, FIG. 1 is a high-level block diagram of a system 100 architecture in accordance with some embodiments. The system 100 includes an integration service provisioning application 130 that may be accessed by a customer or tenant administrator 120 (e.g., to configure a SaaS application for the customer's requirements). The integration service provisioning application 130 may send information to a tenant manager 140 that establishes and maintains the applications for each individual tenant 142. When necessary, a SaaS administrator 160 may utilize a software update service 150 to update the SaaS with a new software version (e.g., to provide new functionality, fix software bugs, etc.). According to some embodiments, the software update service 150 access an early update flag to tenant map 152 to provide the new software version to some tenants in advance of other tenants. This process might be performed automatically or be initiated via a command from a remote interface device. As used herein, the term "automatically" may refer to, for example, actions that can be performed with little or no human intervention.

As used herein, devices, including those associated with the system 100 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The integration service provisioning application 130 and software update service 150 may store information into and/or retrieve information from various data stores, which may be locally stored or reside remote from the integration service provisioning application 130 and software update service 150. Although a single integration service provisioning application 130 and software update service 150 are shown in FIG. 1, any number of such devices may be included. Moreover, various devices described herein might be combined according to embodiments of the present invention. For example, in some embodiments, the integration service provisioning application 130 and tenant manager 140 might comprise a single apparatus. Any of the system 100 functions may be performed by a constellation of networked apparatuses, such as in a distributed processing or cloud-based architecture.

A user or administrator may access the system 100 via a remote device (e.g., a Personal Computer ("PC"), tablet, or smartphone) to view information about and/or manage operational information in accordance with any of the embodiments described herein. In some cases, an interactive graphical user interface display may let an operator or administrator define and/or adjust certain parameters (e.g., to define early update requirements) and/or provide or receive automatically generated recommendations, reports, or results from the system 100. In some cases, a cloud platform integration may be built using a microservice architecture (e.g., the underlying cloud platform 140 may comprise CLOUD FOUNDRY®).

Figure 2:
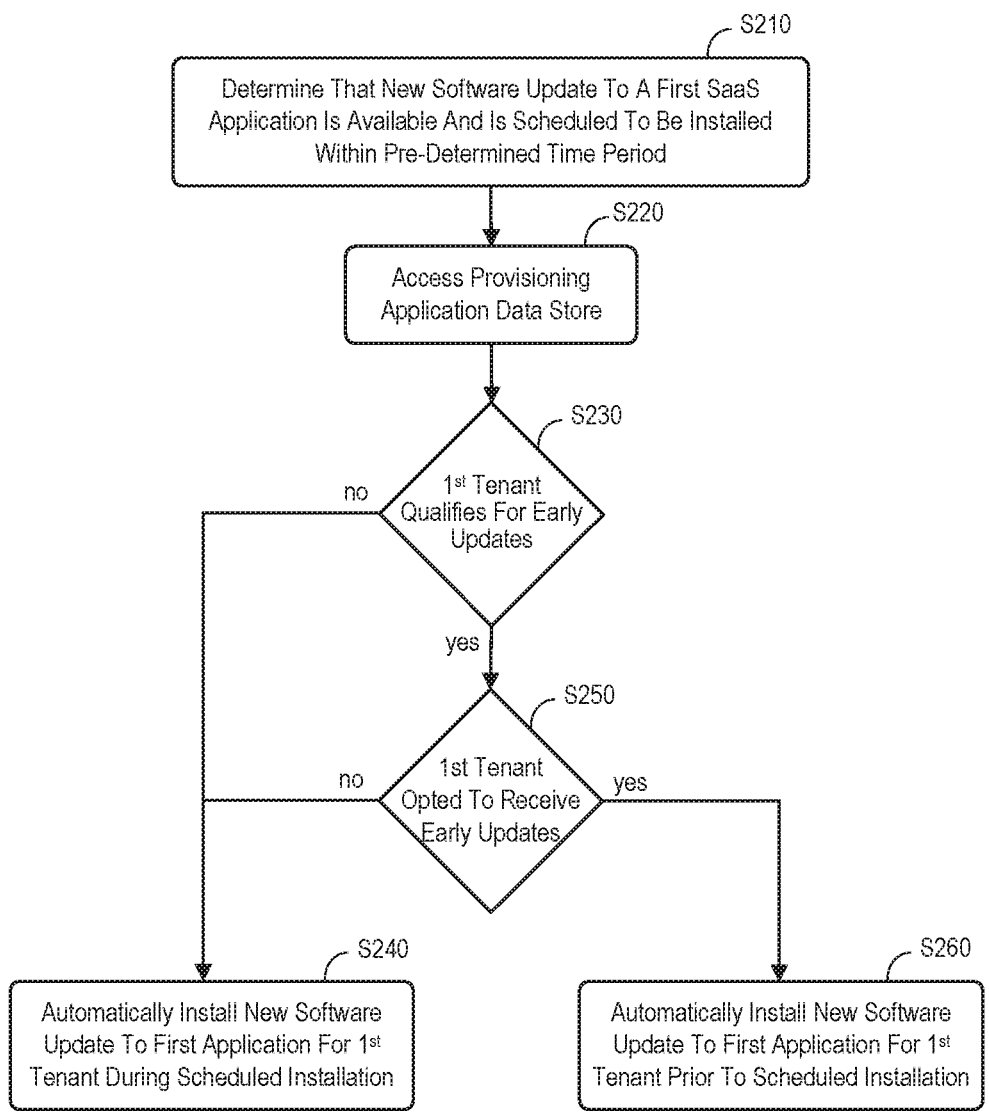
FIG. 2 is a method according to some embodiments.

FIG. 2 is a method that might performed by some or all of the elements of the system 100 described with respect to FIG. 1. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, a computer processor of a cloud platform provisioning framework may determine that a new software update to a first SaaS application is available and is scheduled to be installed within a pre-determined time period (e.g., one day or one week). According to some embodiments, the time period is associated with at a time period selected by the first tenant. Note that different tenants might be associated with different time periods. At S220, the cloud platform provisioning framework may access a provisioning application data store. The provisioning application data store may, for example, contains information associated with services representing a plurality of multi-tenant cloud applications. According to some embodiments, the applications are executed in a microservice-based cloud computing environment.

At S230, the system may determine if a first tenant qualifies for early software updates. For example, the first tenant might qualify for early software updates if a customer had subscribed to such a feature. If the first tenant does not qualify for early software updates at S230, the system may automatically install the new software update to the first application for the first tenant during the usual scheduled installation at S240.

If the first tenant does qualify for early software updates at S230, the system may determine if the first tenant opted to receive early software updates at S250. For example, the provisioning data store may indicate if the first tenant opted to receive early software updates in a SaaS marketplace via a graphical user interface selection. According to some embodiments, the graphical user interface selection for the first application is only displayed to tenants who qualify for early software updates. If the first tenant did not opt to receive early software updates at S250, the system may automatically install the new software update to the first application for the first tenant during the usual scheduled installation at S240. If the first tenant did opt to receive early software updates at S250, the system may automatically install the new software update to the first application for the first tenant prior to the scheduled installation at S260.

Figure 3:
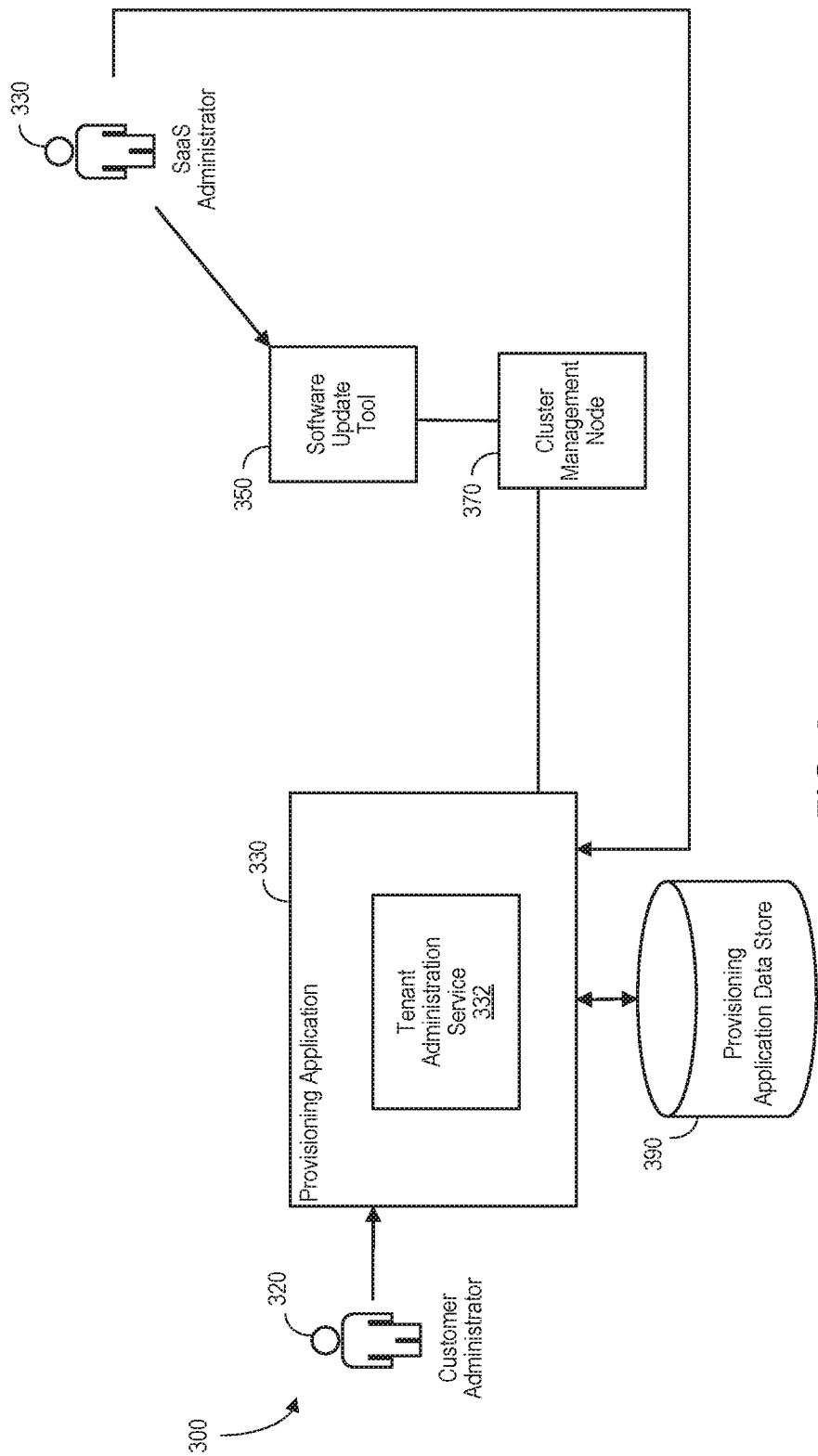
FIG. 3 is a high-level integration service design in accordance with some embodiments.
Figure 4:
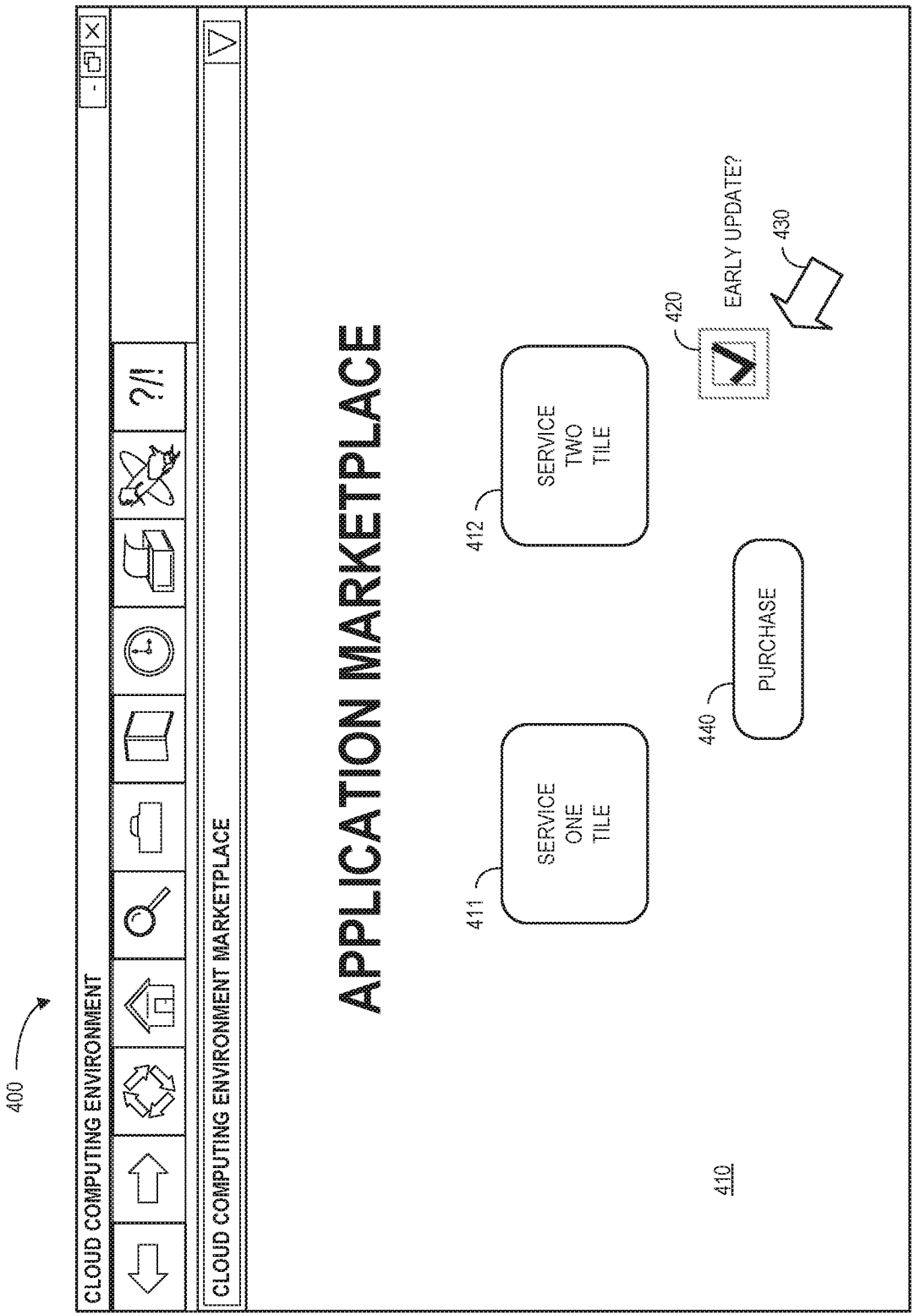
FIG. 4 is a SaaS marketplace graphical user interface that may be accessed by a customer or tenant administrator according to some embodiments.

FIG. 3 is a high-level integration service design 300 in accordance with some embodiments. A provisioning application 330 may be utilized by a customer or tenant administrator 320 and access information in a provisioning application data store 390. A tenant administration service 332 in the provisioning application 330 may communicate with a software update tool 350 via a cluster management node 370 to arrange to provide early software updates (e.g., launched by a SaaS administrator 330) to certain customers and/or tenants. For example, FIG. 4 is a SaaS marketplace graphical user interface display 400 that may be accessed by a customer or tenant administrator according to some embodiments. The display 400 includes a selection area 410 with a service one tile 431 and a service two tile 432 that may be selected by a consumer (e.g., via a touchscreen or computer mouse pointer 430). According to this embodiment, the display 400 further includes an "early update" option 420 that can be selected by the consumer to purchase this feature. Note that the early update option 420 might only be displayed for certain applications (e.g., in FIG. 4 it is shown displayed for the service two tile 432 but not for the service one tile 431).

According to some embodiments, an indication may later be received that the first tenant no longer opts to receive early software updates. In this case, subsequent software updates are not automatically installed for the first tenant prior to the scheduled installation. Similarly, an indication may later be received that the first tenant no longer qualifies for early software updates. Again in this case, subsequent software updates are not automatically installed for the first tenant prior to the scheduled installation. Note that provisioning application data store indications may be recorded and/or updated via a global store service of the cloud computing environment, a service provider Application Programming Interface ("API") push, etc.

In this way, embodiments may provide early software updates to a multi-tenant integration service. For example, software update may be provided earlier to TEST tenants. Consider a customer who maintains two tenants (TEST and PRODUCTION) and if they get a software update one week earlier to the TEST tenant (as compared to the PRODUCTION tenant), then the customer may have enough time to remodel and redeploy the newest integration content as appropriate. As a result, the customer may avoid or reduce downtime.

Embodiments may provide a software design that meets the following solutions in an easy and extendable way:
  An ability for a customer to mark (e.g., switch) a tenant for early updates and also de-mark (e.g., switch back) to opt out of early updates.
  A software component to handle a commercialization aspect. For example, a service provider may charge the customer for an early update feature. Embodiments may provide a software design solution to offer the configuration ability only when the commercial requirements are met thought ordering of additional capabilities.

Figure 5:
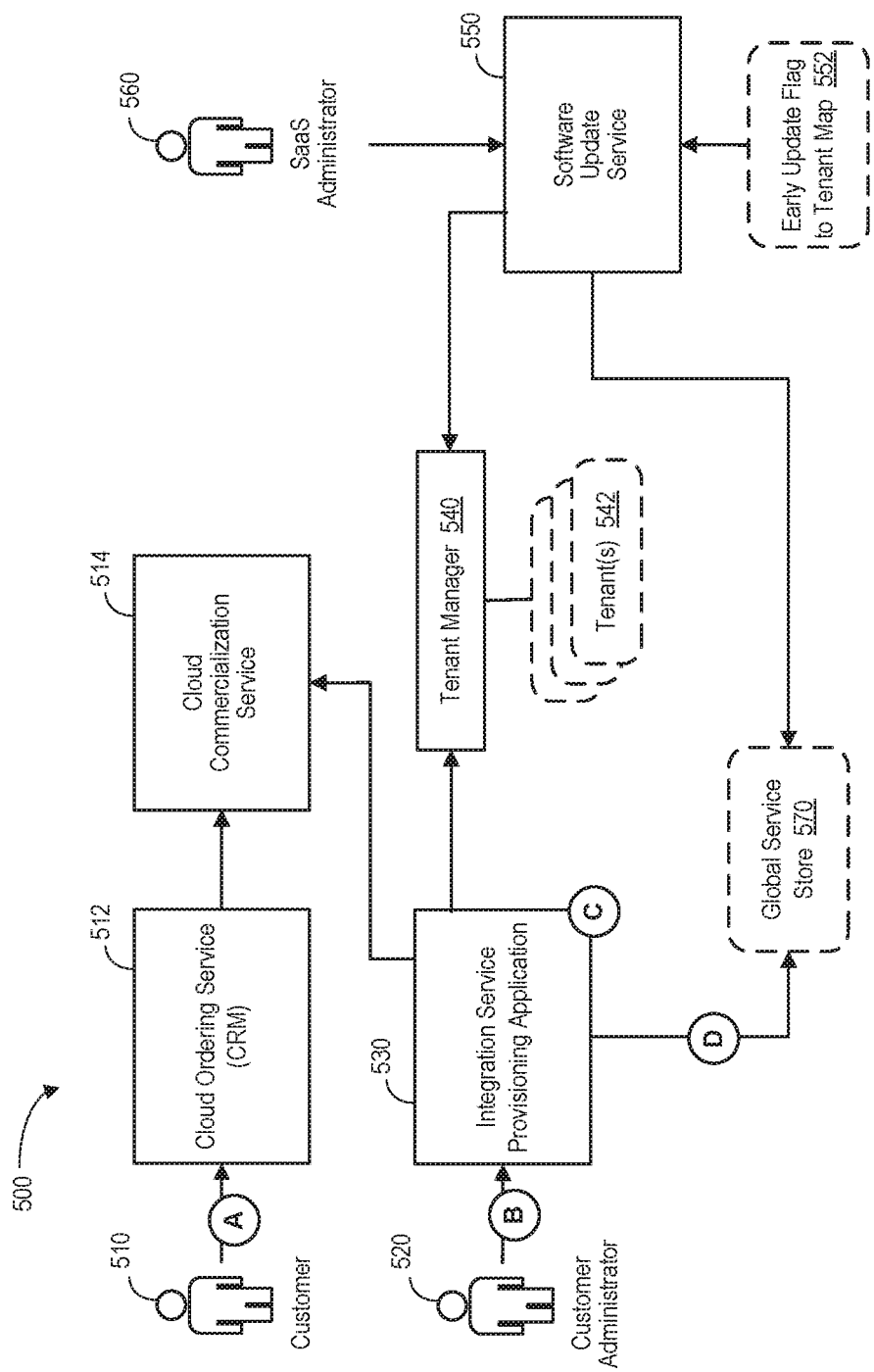
FIG. 5 is a more detailed system architecture in accordance with some embodiments.

FIG. 5 is a more detailed system 500 architecture in accordance with some embodiments. As before, the system 500 includes an integration service provisioning application 530 that may be accessed by a customer or tenant administrator 520 (e.g., to configure a SaaS application for the customer's requirements). The integration service provisioning application 530 may send information to a tenant manager 540 that establishes and maintains the applications for each individual tenant 542. When necessary, a SaaS administrator 560 may utilize a software update service 550 to update the SaaS with a new software version (e.g., to provide new functionality, fix software bugs, etc.). According to some embodiments, the software update service 550 access an early update flag to tenant map 552 to provide the new software version to some tenants in advance of other tenants.

The general architecture of an integration service in a cloud and multi-cloud setup may include an ordering system or cloud ordering service 512 (e.g., associated with Client Relationship Managements ("CRM")) and a cloud commercialization service 514 or Commercial Infrastructure Service ("CIS") lets service owners register the service in the cloud platform (and make it discoverable to buy and subscribe). Using these constructs, an integration service is usually offered by providing the integration service provisioning application 540. The integration service provisioning application 530 may be used by the tenant or customer administrator to provision a tenant and manage the system 500. Embodiments may provide a solution of offering marking-a-tenant as an early update eligible tenant via a User Interface ("UI") configuration of a global service store 570. This configuration may allow for new provisioning (as well as existing tenants which are already provisioned). The software update service 550 is used by the SaaS provider administrator 560 to periodically push new software updates.

For example, at (A) a customer 510 may order or purchase an application. At (B), the customer administrator 520 may provision and management the tenant. For example, the customer administrator 530 might purchase an early update option via the integration service provisioning application 540 at (C). The integration service provisioning application 540 may then push the early update flag to the global service store 570 at (D).

Figure 6:
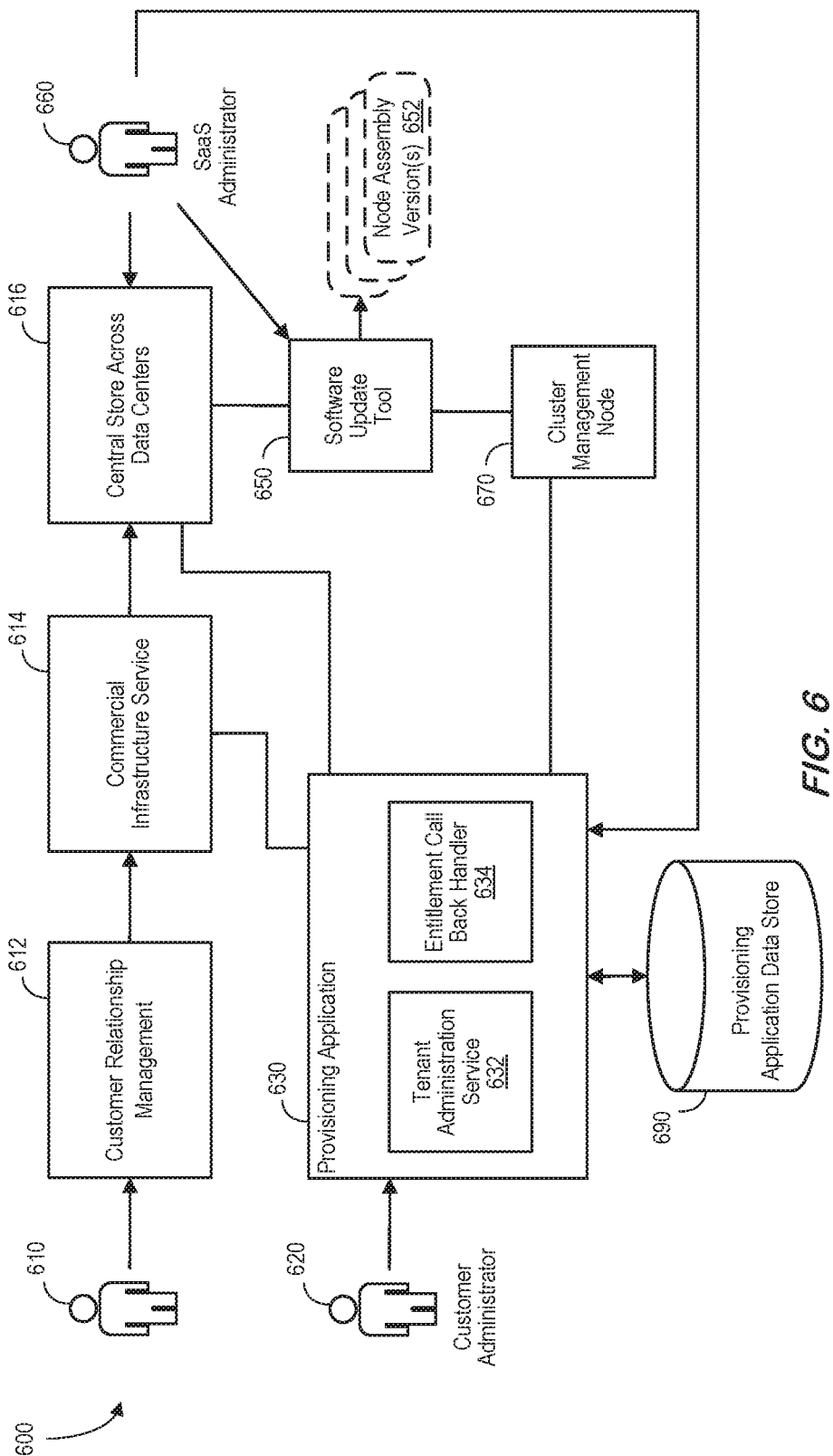
FIG. 6 is a more detailed integration service design in accordance with some embodiments.

FIG. 6 is a more detailed integration service design 600 in accordance with some embodiments. As before, a provisioning application 630 may be utilized by a customer or tenant administrator 620 and access information in a provisioning application data store 690. A tenant administration service 632 in the provisioning application 630 may communicate with a software update tool 650 via a cluster management node 670 to arrange to provide early software updates (e.g., launched by a SaaS administrator 630) to certain customers and/or tenants.

Some embodiments may be based on an architecture of integration service (e.g., CPI). In such cases, is common to have a provisioning application/service 630 (e.g., including an entitlement call back handler 634) to subscribe to an integration service tenant in a self-service manner. In a cloud service enablement architecture, a customer 610 buys a specific cloud service (e.g., an integration service) using CRM 612. For example, a customer might buy or subscribe to a TEST service package and provision an integration service tenant using the provisioning application 630. This information might be updated in a central store across data centers 616 through a CIS 614. The provisioning application 630 may, for example, offer a choice if the TEST service is purchased (the provisioning application 630 may check this information from the ordering system) and mark the tenant as being a provisioned as an "eligible early updatable" tenant. If marked, the provisioning application 630 talks to the software update tool 650 (e.g., associated with node assembly versions 652) and keeps this information as a configuration in the software update tool 650. The software update tool 650 understand this configuration and triggers early software updates to those tenants that are marked.

The cluster management node 670 may comprise a software component that helps in provisioning and managing tenants. Each cluster management node 670 may hold a set of finite tenants. Embodiments may offer a configuration per tenant in such a way that there is no downtime on marking a tenant as test tenant. That is, when a customer marks a tenant as a TEST tenant, the tenant will not be moved to a TEST cluster (by the cluster management node 670) to avoid any downtime. Moreover, the central store across data centers 616 may act as a global store for maintaining the eligible tenants for early software updates.

Figure 7:
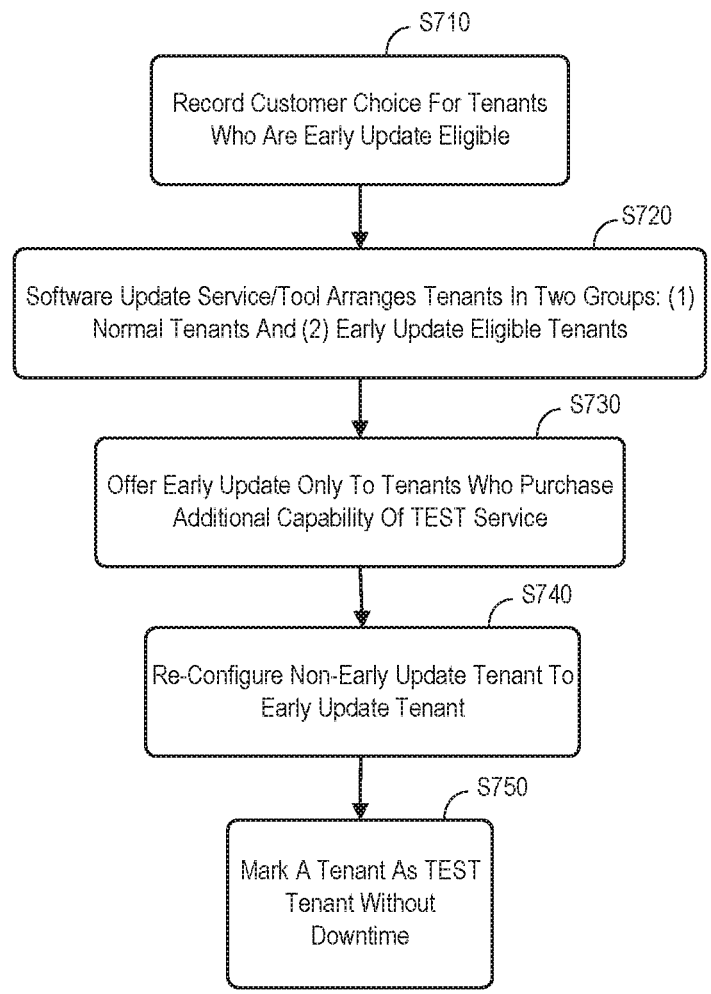
FIG. 7 is a more detailed method according to some embodiments.

FIG. 7 is a more detailed method according to some embodiments. At S710, the system may record a customer choice for tenants who are early update eligible. Note that embodiments may add additional software components to a provisioning service and a software update service. The provisioning service may offer a configuration option to a tenant administrator to mark a tenant as early update eligible. Upon selecting this option, the provisioning application may push the tenant marking data (e.g., an XML) to a global store. The global store may comprise, for example, a service or a database which will be once per entire cloud landscape whereas the provisioning application is one instance per data center. The provisioning application may make sure that the exactly once Quality of Service ("QoS") is maintained such that the customer choice is recorded. For example, the payload may contain:
<tenantIdentifier>tenantabc</tenantIdentifier>
<tenantEnvironment>test-early-update-eligible</tenantEnvironment>

At S720, the system may enhance an existing software update service (tool) to understand different markings of a tenant using the global store. Note that the global store is only one option to push the information of the tenant marking. Some embodiments might instead directly use the software update service to push this information if possible. For example, some providers may have an API of the software update service to configure the tenant environments (and these APIs can be used to push the marking data).

The software update tool may consider this marking and arrange the tenants in two groups: (1) normal tenants and (2) early update eligible tenants. The software update tool can also provide the configuration to set the definition of early update (e.g., one week or two weeks or a few days). Based on this configuration, the software update may trigger early updates to these tenants. All other features of existing software update may remain unchanged (e.g., notifications to the customers about the update should be triggered after the early updates).

In some embodiments, a tenant may qualify for early software updates because of a purchase transaction. For example, at S730 the system may offer (or restrict) early update to only those tenants who have purchased additional capability of TEST service. At S740, the system may re-configure a non-early updatable tenant into an early updatable tenant. This feature may, for example, provide a marking functionality at any given point in time. For example, a customer can provision a tenant without marking it as early update ready and later purchase the TEST service and then mark it as early update ready. At S750, the system may mark a tenant as TEST tenant without downtime.

In this way, embodiments may support a feature to test customer contents that can be procured from an application marketplace store. This additional service enablement on the test tenant may help the customer find out issues/recommendations from the SaaS provider prior to an actual monthly software update rollout (e.g., a "preview test"). For example, some tenants might get updated one week prior to a planned or scheduled software update.

Figure 8:
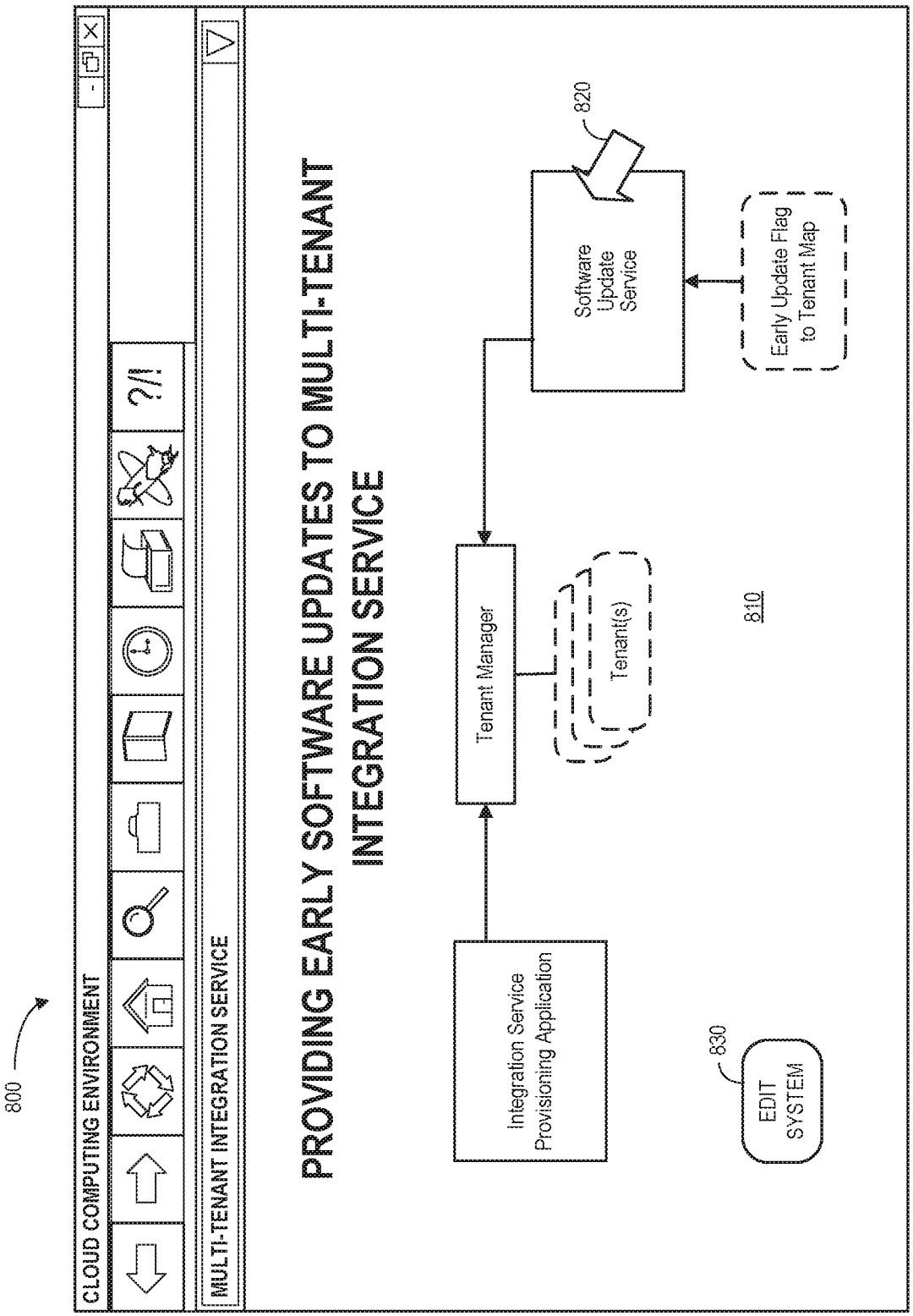
FIG. 8 is a human machine interface display according to some embodiments.

FIG. 8 is a human machine interface display 800 in accordance with some embodiments. The display 800 includes a graphical representation 810 of a provisioning system in accordance with any of the embodiments described herein. Selection of an element on the display 800 (e.g., via a touchscreen or a computer pointer 820) may result in display of a pop-up window containing more detailed information about that element and/or various options (e.g., to add a microservice, subscribe to an early software update feature, etc.). Selection of an "Edit System" icon 830 may also let an operator or administrator adjust the operation of the provisioning system.

Figure 9:
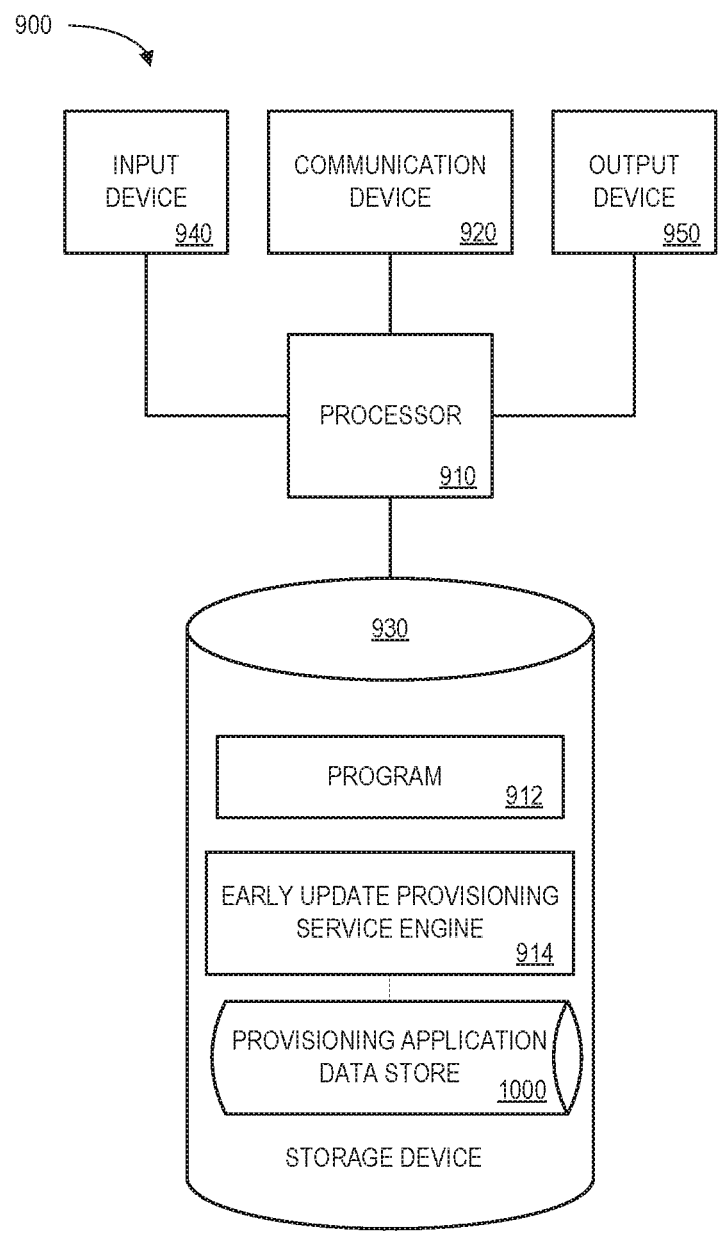
FIG. 9 is an apparatus or platform according to some embodiments.

Note that the embodiments described herein may also be implemented using any number of different hardware configurations. For example, FIG. 9 is a block diagram of an apparatus or platform 900 that may be, for example, associated with the systems 100, 300 of FIGS. 1 and 3, respectively (and/or any other system described herein). The platform 900 comprises a processor 910, such as one or more commercially available Central Processing Units ("CPUs") in the form of one-chip microprocessors, coupled to a communication device 960 configured to communicate via a communication network (not shown in FIG. 9). The communication device 960 may be used to communicate, for example, with one or more remote user platforms, administrator platforms, etc. The platform 900 further includes an input device 940 (e.g., a computer mouse and/or keyboard to input microservice and integration service information) and/an output device 950 (e.g., a computer monitor to render a display, transmit recommendations or alerts, and/or create reports about integration services, tenants, users, etc.). According to some embodiments, a mobile device or PC may be used to exchange information with the platform 900.

The processor 910 also communicates with a storage device 930. The storage device 930 may comprise any appropriate information storage device, including combinations of magnetic storage devices (e.g., a hard disk drive), optical storage devices, mobile telephones, and/or semiconductor memory devices. The storage device 930 stores a program 912 and/or an early update provisioning service engine 914 for controlling the processor 910. The processor 910 performs instructions of the programs 912, 914, and thereby operates in accordance with any of the embodiments described herein. For example, the processor 910 may access a provisioning application data store 1000 that contains information associated with services representing a plurality of multi-tenant cloud applications including, for a first SaaS application, indications that a first tenant qualifies for early software updates and has opted to receive early software updates. The processor 910 may determine that a new software update to the first application is available and is scheduled to be installed within a pre-determined time period (e.g., one day or week). The processor 910 may then access the provisioning application data store 1000 to verify that the first tenant qualifies for early software updates and has opted to receive early software updates. As a result of the verification, the processor 910 may automatically install the new software update to the first application for the first tenant prior to the scheduled installation.

The programs 912, 914 may be stored in a compressed, uncompiled and/or encrypted format. The programs 912, 914 may furthermore include other program elements, such as an operating system, clipboard application, a database management system, and/or device drivers used by the processor 910 to interface with peripheral devices.

As used herein, information may be "received" by or "transmitted" to, for example: (i) the platform 900 from another device; or (ii) a software application or module within the platform 900 from another software application, module, or any other source.

In some embodiments (such as the one shown in FIG. 9), the storage device 930 stores the provisioning application data store 1000. An example of a database that may be used in connection with the platform 900 will now be described in detail with respect to FIG. 10. Note that the database described herein is only one example, and additional and/or different information may be stored therein. Moreover, various databases might be split or combined in accordance with any of the embodiments described herein.

Figure 10:
FIG. 10 is portion of a provisioning application data store in accordance with some embodiments.

Referring to FIG. 10, a table is shown that represents the provisioning application data store 1000 that may be stored at the platform 900 according to some embodiments. The table may include, for example, entries associated with tenants of a cloud computing environment. The table may also define fields 1002, 1004, 1006, 1008, 1010 for each of the entries. The fields 1002, 1004, 1006, 1008, 1010 may, according to some embodiments, specify: a customer/tenant and application identifiers 1002, an early update qualified indication 1004, an early update selected indication 1006, a next application update indication 1008, and an install early indication 1010. The provisioning application data store 1000 may be created and updated, for example, when new applications are added to a system, new tenants are added or updated, etc.

The customer/tenant and application identifiers 1002 might be unique alphanumeric labels that are associated with a specific tenant and application. The early update qualified indication 1004 might reflect if that tenant has subscribed to an early update TEST feature (e.g., in FIG. 10, "CT_101" is not eligible while the other tenants are eligible). The early update selected indication 1006 may reflect if the tenant has "opted in" the feature for this application. Note that "CT_101" was not early update qualified and, as a result, early update is not available to be selected. The next application update indication 1008 may reflect when a new software update is scheduled to be deployed. In this example, software will be installed one week ahead of schedule for TEST tenants. The install early indication 1010 may reflect if an update will be automatically installed ahead of the scheduled release. That is, both early update qualified 1004 and early update selected 1006 must be "YES." Note that an early update is not scheduled for "CT_1003" because it is two weeks away.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of integration services and microservices, any of the embodiments described herein could be applied to other types of applications. Moreover, the displays shown herein are provided only as examples, and any other type of user interface could be implemented. Any of the embodiments described herein may provide other types of applications and/or displays.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system associated with a cloud computing environment, comprising:
   a provisioning application data store containing information associated with services representing a plurality of multi-tenant cloud applications including, for a first Software as a Service ("SaaS") application, indications that a customer's TEST tenant qualifies for early software updates and has opted to receive early software updates; and
   a cloud platform provisioning framework, coupled to the provisioning application data store, including:
      a computer processor, and
      computer memory, coupled to the computer processor, storing instructions that, when executed by the computer processor cause the cloud platform provisioning framework to:
         (i) determine that a new software update to the first SaaS application is available and is scheduled to be installed within a pre-determined time period,
         (ii) access the provisioning application data store to verify that the customer's TEST tenant qualifies for early software updates and has opted to receive early software updates, and
         (iii) as a result of the verification, automatically install the new software update to the first SaaS application for the customer's TEST tenant prior to the scheduled installation without installing the new software update for a PRODUCTION tenant of the customer.

2. The system of claim 1, wherein the applications are executed in a microservice-based cloud computing environment.

3. The system of claim 1, wherein the customer's TEST tenant opted to receive early software updates in a SaaS marketplace via a graphical user interface selection.

4. The system of claim 3, wherein the graphical user interface selection for the first SaaS application is only displayed to tenants who qualify for early software updates.

5. The system of claim 1, wherein an indication is received that the customer's TEST tenant no longer opts to receive early software updates and subsequent software updates are not automatically installed for the customer's TEST tenant prior to the scheduled installation.

6. The system of claim 1, wherein the customer's TEST tenant qualifies for early software updates because of a purchase transaction.

7. The system of claim 1, wherein an indication is received that the customer's TEST tenant no longer qualifies for early software updates and subsequent software updates are not automatically installed for the customer's TEST tenant prior to the scheduled installation.

8. The system of claim 1, further comprising:
   a cluster management node to move the TEST tenant to a test cluster to avoid downtime.

9. The system of claim 1, wherein the provisioning application data store indications are recorded via at least one of: (i) a global store service of the cloud computing environment, and (ii) a service provider Application Programming Interface ("API") push.

10. The system of claim 1, wherein the time period is associated with at least one of: (i) one week, (ii) one day, and (iii) a time period selected by the first customer's TEST tenant.

11. The system of claim 10, wherein different tenants are associated with different time periods.

12. A computer-implemented method associated with a cloud computing environment, comprising:
   determining, by a computer processor of a cloud platform provisioning framework, that a new software update to a first Software as a Service ("SaaS") application is available and is scheduled to be installed within a pre-determined time period;
   accessing, by the cloud platform provisioning framework, a provisioning application data store to verify that a customer's TEST tenant qualifies for early software updates and has opted to receive early software updates, wherein the provisioning application data store contains information associated with services representing a plurality of multi-tenant cloud applications; and
   as a result of the verification, automatically installing the new software update to the first SaaS application for the customer's TEST tenant prior to the scheduled installation without installing the new software update for a PRODUCTION tenant of the customer.

13. The method of claim 12, wherein the customer's TEST tenant opted to receive early software updates in a SaaS marketplace via a graphical user interface selection.

14. The method of claim 13, wherein the graphical user interface selection for the first SaaS application is only displayed to tenants who qualify for early software updates.

15. The method of claim 12, wherein an indication is received that the customer's TEST tenant no longer opts to receive early software updates and subsequent software updates are not automatically installed for the customer's TEST tenant prior to the scheduled installation.

16. The method of claim 12, wherein the customer's TEST tenant qualifies for early software updates because of a purchase transaction.

17. The method of claim 12, wherein an indication is received that the customer's TEST tenant no longer qualifies for early software updates and subsequent software updates are not automatically installed for the customer's TEST tenant prior to the scheduled installation.

18. A non-transitory, computer-readable medium storing instructions, that, when executed by a processor, cause the processor to perform a method associated with a cloud computing environment, the method comprising:
   determining, by a computer processor of a cloud platform provisioning framework, that a new software update to a first Software as a Service ("SaaS") application is available and is scheduled to be installed within a pre-determined time period;
   accessing, by the cloud platform provisioning framework, a provisioning application data store to verify that a customer's TEST tenant qualifies for early software updates and has opted to receive early software updates, wherein the provisioning application data store contains information associated with services representing a plurality of multi-tenant cloud applications; and
   as a result of the verification, automatically installing the new software update to the first SaaS application for the customer's TEST tenant prior to the scheduled installation without installing the new software update for a PRODUCTION tenant of the customer.

\* \* \* \* \*